June 7, 1955   A. L. COMBS   2,710,197
LIFT JACK DOLLY FOR FACTORY TRUCKS
Filed July 22, 1954   2 Sheets-Sheet 1
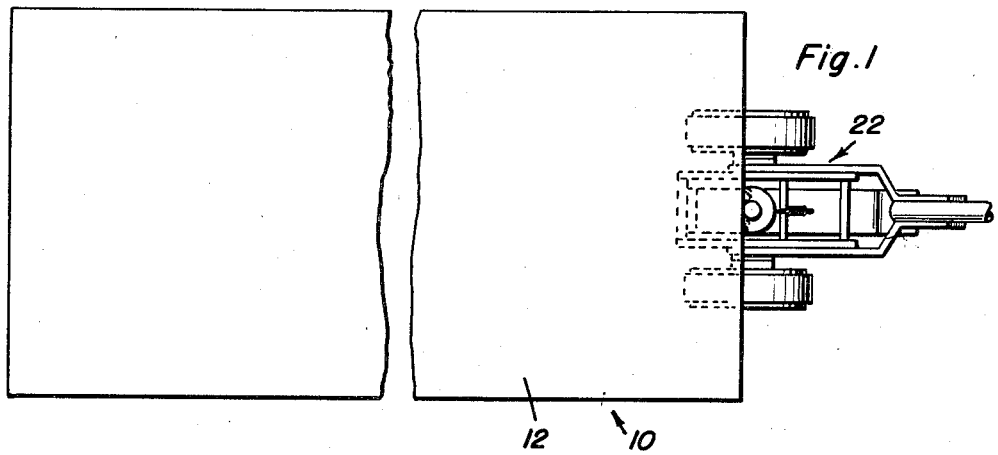
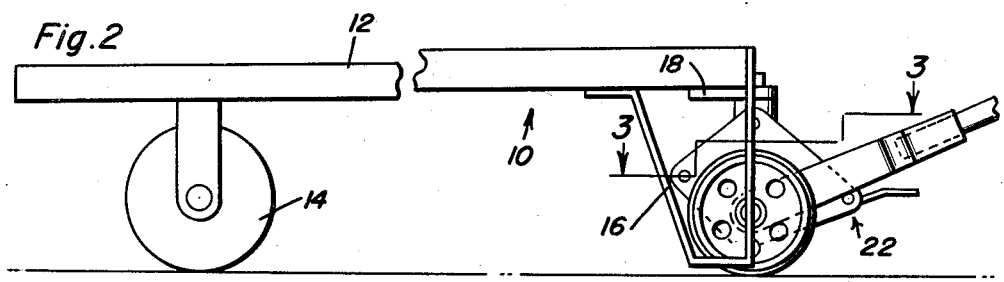
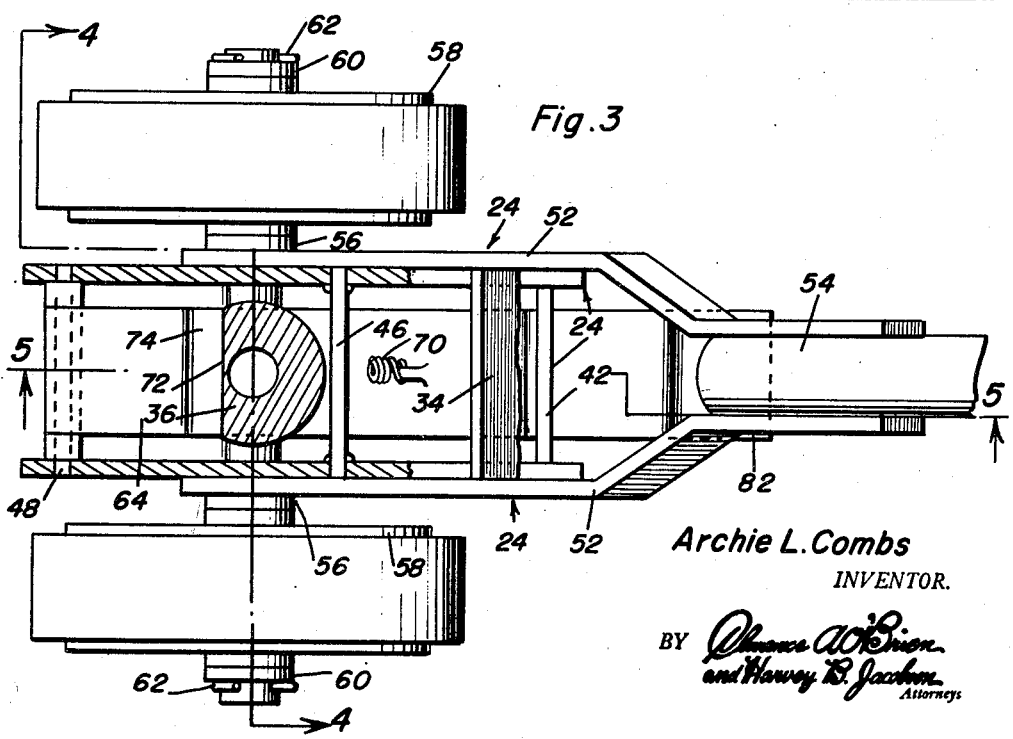
Archie L. Combs
INVENTOR.

June 7, 1955     A. L. COMBS     2,710,197
LIFT JACK DOLLY FOR FACTORY TRUCKS
Filed July 22, 1954     2 Sheets-Sheet 2
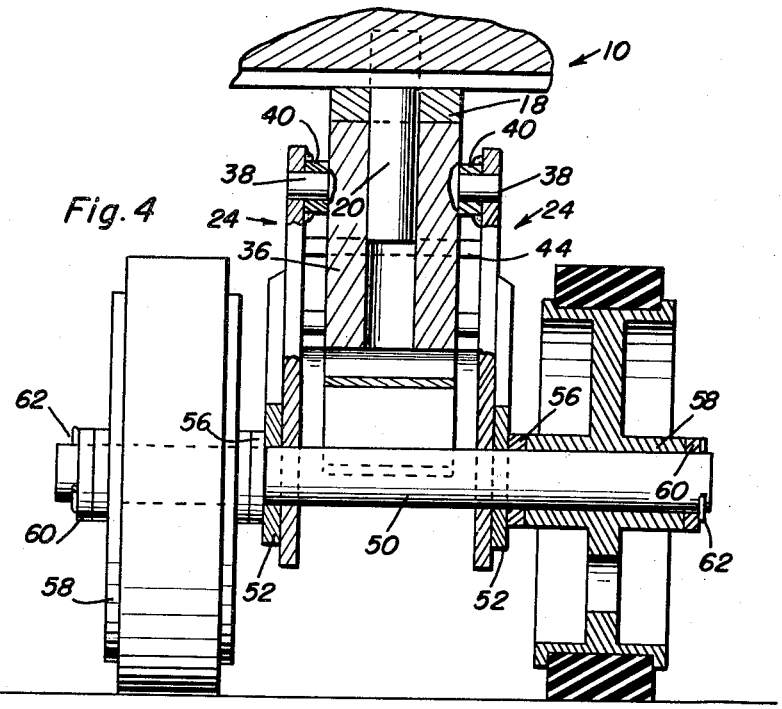
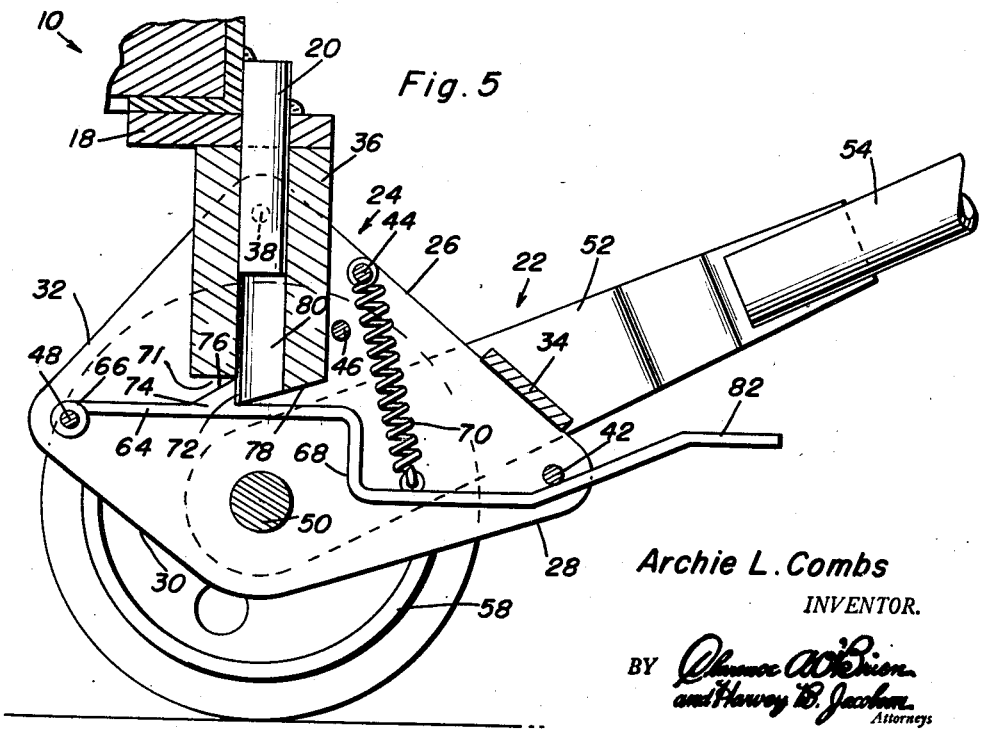
Archie L. Combs
INVENTOR.

United States Patent Office 2,710,197
Patented June 7, 1955

2,710,197
LIFT JACK DOLLY FOR FACTORY TRUCKS

Archie L. Combs, Bartonville, Ill., assignor of fifty per cent to Clarence Roots, Peoria, Ill.

Application July 22, 1954, Serial No. 445,050

1 Claim. (Cl. 280—46)

This invention relates in general to improvements in lift jacks, and more specifically to an improved lift jack dolly for use in combination with factory trucks.

There are in common usage factory trucks which include a platform type body provided at one end with a pair of wheels and at the other end with feet. When it is desired to move a factory truck from one position to another, it is necessary to jack up the end provided with the feet and set the same on a dolly so that the dolly may be utilized in the movement of the factory truck.

The use of lift jack dollies in combination with factory trucks is old and well known. However, the average dolly is so constructed whereby it cannot be conveniently manipulated so as to connect and disconnect it from a factory truck. Therefore, it is the primary object of this invention to provide an improved lift jack dolly which is so constructed whereby the same may be conveniently operated with a minimum of effort to position the socket of the dolly with respect to a pin of the factory truck.

Another object of this invention is to provide an improved lift jack dolly for factory trucks which is so constructed whereby it may be fabricated of sheet metal stock so as to both reduce the weight and the expense of such dolly.

A further object of this invention is to provide an improved lift dolly for factory trucks, the dolly being so constructed whereby the weight thereof is relatively light as compared with other types of dollies so that the dolly may be easily manipulated and transported from place to place.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a factory truck which has attached thereto the lift dolly which is the subject of this invention, an intermediate portion of the factory truck being omitted and a portion of the handle of the lift jack dolly being broken off;

Figure 2 is a side elevational view of the factory truck and lift jack dolly of Figure 1, the above mentioned portions being broken away and shows the relationship of the dolly with respect to the truck when the dolly is in a truck-lifting position;

Figure 3 is an enlarged fragmentary horizontal sectional view taken substantially upon the plane indicated by the section line 3—3 of Figure 2 and shows more clearly the details of construction of the lift jack dolly;

Figure 4 is an enlarged fragmentary vertical sectional view taken substantially upon the plane indicated by the section line 4—4 of Figure 3 and shows the relationship between the socket and the pin; and Figure 5 is an enlarged fragmentary longitudinal vertical sectional view taken substantially upon the plane indicated by the section line 5—5 of Figure 3 and shows the relationship of the various working parts of the lift jack dolly.

Referring now to the drawings in detail, it will be seen that there is best illustrated in Figures 1 and 2 a factory truck which is referred to in general by the reference numeral 10. The factory truck 10 includes a platform-type like body 12 which has one end thereof supported by a plurality of wheels 14. The other end of the body 14 is provided with feet 16 to retain the same in an elevated position. The feet 16 normally engage a supporting surface so as to prevent the accidental movement of the factory truck 10.

In order that the factory truck 10 may be moved from place to place when desired, there is secured to the forward portion of the body 12 a plate 18 which has depending therefrom a pin 20, as is best illustrated in Figure 5. The pin 20 is intended to have associated therewith a dolly for moving the factory truck from place to place. Associated with the pin 20 of the factory truck 10 is the lift jack dolly which is the subject of this invention, the dolly being referred to in general by the reference numeral 22.

The dolly 22 includes a pair of identical, transversely spaced, generally diamond shaped plates 24. The diamond shaped plates 24 have upper forward edges 26, lower forward edges 28, lower rear edges 30 and upper rear edges 32. The lower forward-most portions of the forward front edges 26 are connected together by a transverse strap 34. Further, the upper portions of the plates 24 are retained in spaced relation by a socket 36 which includes pivot pins 38 received in upper portions of the plates 24. The pivot pins 38 are received in sleeves 40 secured to the inner faces of the plates 24 as is best illustrated in Figure 4.

As is best illustrated in Figure 5, there is extending between the forward corners of the plates 24 a stop pin 42. The plates 24 are further connected together by a transverse pin 44 which is disposed adjacent the upper forward edges 26. Disposed below the pin 44 is a stop pin 46. The plates 24 are further connected together at their rear corners by a transverse pivot pin 48.

Extending through the plates 24 is an axle 50. The axle 50 has received thereon bifurcated lower end portions 52 of a handle 54.

Disposed immediately outwardly of the bifurcated end portions 52 are spacers 56 against which wheels 58 carried by the outer ends of the axle 50 bear. The extreme outer end of the axle 50 is provided with washers 60 which bear against the wheels, the washers 60 being retained in place by cotter keys 62.

In order that the socket 36 may be retained in the vertical position illustrated in Figure 5, there is provided latch means which includes a latch bar 64. The latch bar 64 includes an eye 66 at the rear end thereof through which passes the pivot pin 48. The latch bar 64 includes an offset intermediate portion 68 which has connected thereto a spring 70 whose upper end is carried by the pin 44. The spring 70 urges the latch bar 64 upwardly into engagement with the stop pin 42.

The lower end of the socket 36 has the rear portion thereof cut away as at 71 to form a shoulder 72. The latch bar 64 is provided with an upwardly projecting latch element 74 which engages the shoulder 72 and prevents rotation of the socket 36 in a clockwise direction about the pivot pins 38. The stop pin 46 engages the opposite side of the socket 36 to prevent counter-clockwise rotation thereof. It is to be noted that the latch element 74 includes a sloping upper surface 76 and that the socket 36 includes a sloping lower surface 78 to facilitate the positioning of the latch element 74 with respect to the shoulder 72.

As is best illustrated in Figure 5, when the dolly 22 is positioned relative to the factory truck 10, the pin 20 is received in a bore 80 in the socket 36. At the same time the upper end of the socket 36 is in abutting engagement with the underside of the plate 18. When the dolly 22 and the factory truck 10 are so related, the feet 16 are elevated and the factory truck 10 may be moved about as desired. When it is desired to release the dolly 22 from the factory truck 10, it is merely necessary to depress the latch bar 74 by stepping on a forward end portion 82 thereof and swinging the handle 54 in a counter-clockwise direction to a rearwardly disposed substantially vertical position. The strap 34 is connected not only to the plates 24 but also to the bifurcated end portions 52. Accordingly, the plates 24 are rotated about the axle 50 as the handle 54 is rotated. This results in the movement of the pivot pins 38 downwardly and rearwardly and the resultant lowering of the socket 36 until the feet 16 again engage the supporting surface on which the factory truck 10 rests and the socket 36 moves downwardly and out of engagement with the pin 20. The dolly 22 may then be pulled out from beneath the factory truck 10 and moved for use with another factory truck 10. It is to be understood that as long as the handle 54 is disposed in a generally vertical position, the socket 36 will be free of the latch element 74 and inasmuch as the pins 38 are disposed above the center of gravity of the socket 36, the socket 36 will remain in a vertical position for automatic engagement with a pin 20 when the socket 36 is aligned with such pin.

Referring once again to Figure 5 in particular, it will be seen that when the socket 36 is properly positioned with respect to a pin 20, the axis of the pin 20 is directly aligned with the axle 50 so that there is no tendency whatsoever for either the socket 36 or the plates 24 to pivot about the axle 59. By locking the socket 36 in this position, it will be seen that the only force necessary to control the movement of the factory truck 10 will be a steady pull on the handle 50 together with the necessary steering side movement thereof.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A life jack dolly for factory trucks having a fixed vertical coupling pin, comprising an axle, wheels carried at the outer ends of said axles, a pair of spaced plates carried by said axle in eccentric relation, a socket pivotally mounted between said plates above said axle, the pivotal connection for said socket being above the center of gravity of said socket whereby said socket is normally urged to a vertical position, a handle secured to said plates for pivoting said plates to move said socket about said axle, latch means carried by said plates for fixing said socket relative to said plates, said latch means including an elongated latch bar terminally pivoted at rearward parts of said plates on a pivot pin and extending forwardly therebetween below said socket and above said axle, said latch bar including a latch element engaging a bottom portion of said socket, spring means connected to said latch bar for urging said latch element into engagement with said socket, a stop pin for limiting pivoting of said latch bar, said plates being generally diamond shaped, said axle, said pivotal connection, said pivot pin and said stop pin being disposed in the corners of said plates.

References Cited in the file of this patent

UNITED STATES PATENTS

| | | |
|---|---|---|
| 2,111,554 | Clark | Mar. 22, 1938 |
| 2,190,953 | Smith | Feb. 20, 1940 |
| 2,248,398 | Thorne | July 8, 1941 |